United States Patent [19]

Ito et al.

[11] Patent Number: 4,672,095
[45] Date of Patent: Jun. 9, 1987

[54] PROCESS FOR PRODUCING VINYL POLYMER

[75] Inventors: Shichinosuke Ito, Izumi; Fumio Yamamoto, Izumiohtsu, both of Japan

[73] Assignee: Dainippon Ink and Chemicals, Inc., Tokyo, Japan

[21] Appl. No.: 410,964

[22] Filed: Aug. 24, 1982

[30] Foreign Application Priority Data

Aug. 28, 1981 [JP] Japan ................................ 56-134050

[51] Int. Cl.$^4$ ........................................... C08F 283/04
[52] U.S. Cl. .................................... 525/455; 525/404; 525/440
[58] Field of Search .................. 525/455, 440, 404

[56] References Cited

U.S. PATENT DOCUMENTS 3,705,164 12/1972 Honig et al. .................... 525/455
3,716,505 2/1973 Ohe et al. ........................ 525/455

FOREIGN PATENT DOCUMENTS 2237956 2/1974 Fed. Rep. of Germany .

Primary Examiner—John C. Bleutge
Assistant Examiner—A. L. Carrillo
Attorney, Agent, or Firm—Sherman and Shalloway

[57] ABSTRACT

A process for producing a vinyl chloride polymer, which comprises dissolving a thermoplastic polyurethane soluble in a vinyl chloride monomer in the vinyl chloride monomer and polymerizing the vinyl chloride monomer in the presence of a radical initiator.

11 Claims, No Drawings

PROCESS FOR PRODUCING VINYL POLYMER

This invention relates to a process for producing a vinyl chloride polymer characterized by polymerizing a vinyl chloride monomer in the presence of thermoplastic polyurethane. More specifically, this invention relates to a process for producing a vinyl chloride-grafted polyurethane having excellent flexibility, transparency and moldability.

Heretofore, thermoplastic polyurethane and polyvinyl chloride have been used as tubes, hoses, sheets, industrial component parts, etc. in the form of a polymer blend obtained by blending these polymers in accordance with the polymer blending technique to offset the properties of the respective polymers. Since, however, the blending must be effected in a mixing device such as an extruder or a roll, it has been impossible to provide the desired inexpensive compounds. Another defect is that the polymer blend may stick to the apparatus depending upon the type of the urethane, and the resulting compound does not have satisfactory flexibility and transparency because of the insufficient dispersion of the blending components, and is not feasible in some uses.

The present inventors have found that a vinyl chloride polymer obtained by dissolving a thermoplastic polyurethane in a vinyl chloride monomer and radical-polymerizing vinyl chloride is a molding material free from the aforesaid defects.

Thus, according to this invention, there is provided a process for producing a vinyl chloride polymer, which comprises dissolving a thermoplastic polyurethane soluble in a vinyl chloride monomer, particularly a thermoplastic polyurethane derived from (a) at least one long-chain glycol having a number average molecular weight of at least 500 and containing a hydroxyl group at both terminals, (b) a chain extender having a number average molecular weight of not more than 500 and (c) a polyisocyanate having an isocyanate group at both terminals, in a vinyl chloride monomer, and polymerizing the vinyl chloride monomer in the presence of a radical initiator.

In the process of this invention, any type of polyurethane can be used which is soluble in a vinyl chloride monomer, and a mixing device such as an extruder or roll is not necessary. In addition, the polymer obtained by the process of this invention has much less stickiness, better moldability, lower hardness, greater flexibility and higher transparency than a corresponding compound obtained by the polymer blending technique.

In the present invention, a thermoplastic polyurethane derived from (a) at least one long-chain glycol having a molecular weight of at least 500, preferably 500 to 5000, more preferably 1000 to 2000, and containing a hydroxyl group at both terminals, (b) a chain extender having a number average molecular weight of not more than 500, and (c) a polyisocyanate having an isocyanate group at both terminals is usually employed as the thermoplastic polyurethane soluble in a vinyl chloride monomer. Polyurethanes containing some proportion of a hard segment may also be used if they are soluble in vinyl chloride. Polyurethanes substantially free from a hard segment are preferred. These polyurethanes can be obtained by reacting the components (a), (b) and (c) at a mole ratio satisfying (b)/(a)≦2 and $$0.8 < \frac{(c)}{(a) + (b)} \leq 1.1,$$

preferably 0≦(b)/(a)≦2 and $$0.95 < \frac{(c)}{(a) + (b)} < 1.02.$$

If the mole ratio of (b)/(a) exceeds 2, the stoichiometric reaction product from the glycol and isocyanate is insoluble in the vinyl chloride monomer. In order to obtain a soluble product, the amount of the isocyanate should be adjusted to about 0.5 mole per mole of the glycol, but this polyurethane is very brittle and useless. Hence, the mole ratio of (b)/(a)≦2 is essential. Preferably, the (b)/(a) ratio is about 0 (i.e., containing no chain extender)≦(b)/(a)≦0.5. If the ratio $$\frac{(c)}{(a) + (b)}$$

exceeds 1.1 moles, the product is insoluble in vinyl chloride. Preferably, the ratio is $$0.95 < \frac{(c)}{(a) + (b)} < 1.02.$$

The long-chain glycol having a number average molecular weight of at least 500 and containing a hydroxyl group at both terminals is preferably a linear glycol having a number average molecular weight of 500 to 5,000, i.e. polyether polyols and polyester polyols.

As illustrative of the polyether polyols, there may be cited polyethylene glycol, polypropylene glycol, and polytetramethyene glycol. Examples also include polyteramethylene ether glycol produced from tetrahydrofuran.

Examples of the polyester polyols include those obtained by polycondensing at least one glycol such as ethylene glycol, 1,2-propylene glycol, 2,3-butylene glycol, 1,4-butylene glycol, 2,2'-dimethyl-1,3-propanediol, diethylene glycol, 1,5-pentamethylene glycol, diethylene glycol, 1,5-pentamethylene glycol, 1,6-hexamethylene glycol, cyclohexane-1,4-diol and cyclohexane 1,4-dimethanol with a dibasic acid such as succinic acid, maleic acid, adipic acid, glutaric acid, pimelic acid, suberic acid, azelaic acid, sebacic acid, phthalic acid, isophthalic acid, terephthalic acid, hexahydrophthalic acid and hexahydroisophthalic acid, or the esters or acid halides of these acids. Examples also include polylactone glycols produced by the ring-opening polymerization of alkyl-substituted lactones, such as poly(pentamethylenecarbonyloxy)glycol produced from ε-caprolactone.

Among these long-chain glycols (a), copolyester polyols obtained by reacting at least two low molecular weight glycol components, mixtures of these with different kinds of polyester polyols and mixtures of two or more different polyester polyols are preferred.

Saturated aliphatic glycols having 2 to 10 carbon atoms are preferred as the chain extender (b) having a number average molecular weight of not more than 500. They are used either alone or as a mixture. Specific examples include ethylene glycol, 1,2-propylene glycol, 1,3-propylene glycol, 2,3-butylene glycol, 1,4-butylene glycol, 2,2'-dimethyl-1,3-propanediol, diethylene glycol, 1,5-pentamethylene glycol, 1,6-hexamethylene glycol, cyclohexane-1,4-diol, and cyclohexane-1,4-dimethanol. Triols and tetrols having 4 to 10 carbon atoms, and polyester polyols and polyether polyols having a molecular weight of 500 to 6,000 and containing terminal hydroxyl groups and at least one tertiary hydroxyl group in the molecular chain obtained by using the triols or tetrols may also be used in amounts which do not impair the thermoplasticity of the polyurethanes.

Examples of the triols and tetrols having 4 to 10 carbon atoms include trimethylolpropane, trimethylolethane, 1,2,3-hydroxy-2-methylpropane, 1,2,5-hydroxy-2-ethylpropane, 1,2,4-hydroxy-2-methylbutane, 1,2,5-hydroxy-2-methylpentane, 1,3,5-hydroxy-2-methylpentane, 1,3,6-hydroxy-3-methylhexane, 1,2,3,6-hydroxy-2,3-dimethylhexane, and 1,2,4,6-hydroxy-2,4-dimethylhexane, or their mixtures.

Illustrative as the polyisocyanate (c) are hexamethylene diisocyanate, lysine diisocyanate, cyclohexane diisocyanate, toluidine isocyanate, 2,4-tolylene diisocyanate, 2,6-tolylene diisocyanate, 4,4'-diphenylmethane diisocyanate, p-phenylene diisocyanate, m-phenylene diisocyanate, 1,5-naphthylene diisocyanate, and mixtures of these. Of these, aliphatic diisocyanates are preferred in view of their compatibility with vinyl chloride monomer and the properties of the resulting polymer.

If desired, a catalyst and various stabilizers can be used in the production of the thermoplastic polyurethane. Examples of suitable catalysts include tertiary amines such as triethylamine and triethylenediamine, nitrogen compounds such as morpholine and N-methylmorpholine, metal salts such as potassium acetate and zinc stearate, and organometallic compounds of tin or titanium, such as dibutyltin dilaurate, dibutyltin oxide and tetraisopropyl titanate.

It is possible to add stabilizers against ultraviolet light such as substituted benzotriazoles, stabilizers against heat and oxidation such as phenol derivatives, and lubricants such as stearate salts or ester-type waxes in amounts which do not hamper the polymerization of vinyl chloride.

The thermoplastic polyurethane used in this invention may be produced by conventional known methods. For example, there can be used a method which comprises mixing the reagents fully in the presence, as desired, of a catalyst, casting the mixture onto a flat plate or surface, heating it, then cooling it, and pulverizing the product, a method which comprises injecting a mixture of the reagents into an extruder, and a solution reaction method which comprises reacting the reagent mixture in an organic solvent such as dimethylformamide, toluene, xylene, benzene, dioxane, cyclohexanone, methyl ethyl ketone, methyl isobutyl ketone, ethyl acetate and butyl acetate.

The thermoplastic polyurethane soluble in vinyl chloride may be dissolved in vinyl chloride before the initiation of the reaction. Or at the start of the reaction, it may be put into a reactor together with vinyl monomer to mix them. Dissolving of the polyurethane in vinyl chloride may be effected by heating vinyl chloride or by adding a suitable amount of an organic solvent which does not affect the polymerization reaction. The proportion of the polyurethane to be dissolved is not more than 150% by weight, preferably 30 to 100% by weight, based on vinyl chloride.

Vinyl chloride having dissolved therein the thermoplastic polyurethane may be polymerized by methods normally used in the production of vinyl chloride polymers, for example by suspension polymerization, emulsion polymerization, solution polymerization, bulk polymerization, precipitation polymerization, etc. The suspension polymerization and the emulsion polymerization are preferred.

The suspension polymerization may be carried out as follows:

(1) A solution prepared by dissolving the thermoplastic polyurethane and a polymerization initiator in a vinyl chloride monomer in a reaction vessel is mixed at a time with water containing a suspending agent, and the polymerization is carried out in the resulting dispersion system.

(2) Vinyl monomer, the thermoplastic polyurethane, the polymerization initiator, the suspending agent and water are mixed in a reaction vessel, and the polymerization is carried out in the resulting dispersion system.

(3) A solution prepared by dissolving the thermoplastic polyurethane and the polymerization initiator in vinyl chloride monomer is added dropwise to water containing the suspending agent in the reactor, and the polymerization is carried out in the resulting dispersion system.

In all of these cases, the polymerization is carried out preferably at a temperature of 30° to 70° C.

The polymerization initiator, as referred to herein, is a radical catalyst. Examples include diacyl peroxides such as benzoyl peroxide and lauroyl peroxide; percarbonates such as diisopropyl peroxy dicarbonate, di-2-ethylhexyl peroxy dicarbonate and bis(4-t-butylhexyl)-peroxy dicarbonate, alkyl peresters such as t-butyl peroxy pivalate, t-butyl peroxy octoate, t-butyl peroxy neodecanoate, and acetylcyclohexanesulfonyl peroxide, ketone peroxides and hydroperoxides such as cyclohexanone peroxide and t-butyl hydroperoxide and azo compounds such as α,α'-azobisisobutyronitrile and 2,2'-azobis-2,4-dimethylvaleronitrile. Preferred polymerization initiators are α,α'-azobisisobutyronitrile and 2,2'-azobis-2,4-dimethylvaleronitrile.

These radical catalysts may be used singly or in combination. The amount of the radical catalyst is 0.01 to 5% by weight based on the vinyl chloride monomer. The polymerization intiator may be added dropwise to the reactant mixture at the start of the reaction, or may be added to the aqueous medium or vinyl chloride monomer solution in advance.

The suspending agent may be any which is usually employed in suspension polymerization. Examples include water-soluble polymeric substances such as polyvinyl alcohol, incompletely saponified polyvinyl alcohol, water-soluble cellulose ethers, a vinyl acetate-maleic anhydride copolymer and a styrene/maleic anhydride copolymer, and water-insoluble solid powders such as calcium carbonate, barium sulfate, calcium phosphate, talc and bentonite. They may be used either singly or in combination. There may also be used an anionic surface-active agent such as fatty acid soaps, sodium alkylsulfates, sodium alkylsulfonates and sodium alkylbenzenesulfonates, and a nonionic surface-active agent such as sorbitan alkyl esters, polyoxyethylene alkyl ethers or their esters. The suspending agent is used in an amount of 0.01 to 5% by weight based on the monomer.

When the process of this invention is to be performed by the emulsion polymerization technique, the reactants may be fed into a reactor at a time and then polymerized as in the case of the suspension polymerization. Or it is possible to perform the polymerization reaction while adding dropwise a vinyl chloride monomer having the thermoplastic polyurethane dissolved therein in advance to a reactor containing an emulsifier, a polymerization initiator, water, etc. The suitable reaction temperature is about 30° to about 70° C.

The emulsifier used in the emulsion polymerization may, for example, be one or more of anionic surface-active agents such as sodium alkylsulfonates, sodium alkylsulfates and sodium alkylbenzenesulfonates, and nonionic surface-active agents such as alkyl ethers or esters of polyoxyethylene, sorbitan alkyl esters, polyoxyethylene propylene glycol ether, higher fatty acids and higher alcohols. Preferably, anionic surface-active agents such as sodium alkylbenzenesulfonates are used.

Water-soluble azo compounds such as $\alpha,\alpha'$-azobisisobutyronitrile are examples of radical initiators used in this polymerization reaction. The amount of the radical initiator is 0.01 to 5% by weight based on the vinyl chloride monomer.

During the polymerization of vinyl chloride in the process of this invention, another vinyl monomer may be copolymerized in an amount which does not impair the properties of the resulting polymer. Examples of the other vinyl monomer include vinyl esters, vinyl ethers, acrylic acid, methacrylic acid, alkyl esters of acrylic or methacrylic acid, maleic acid or fumaric acid, esters of maleic or fumaric acid, maleic anhydride, aromatic vinyl compounds, vinylidene halides, vinyl acetate, acrylonitrile, methacrylonitrile, and olefins such as ethylene and propylene.

Another polymer, such as an acrylic polymer, vinyl chloride polymer, a styrene polymer, or ethylene/vinyl acetate polymer, or various additives such as a dispersing aid, a stabilizer, a particle size controlling agent, a molecular weight modifier, a softening agent, a lubricant, or a coloring agent may be added before, during or after the reaction in amounts which do not adversely affect the properties of the resulting polymer.

Those polymers obtained by the process of this invention which have a polyurethane content of 20 to 70% by weight are especially preferred.

The polymers obtained by the process of this invention are graft copolymers which are flexible at room temperature without any particular need to add a plasticizer.

Since they have excellent tensile strength, transparency, moldability and flexibility, they are useful for the production of devices and instruments for foodstuffs, medical devices, instruments and parts, industrial devices, instruments and parts, and various molded articles such as tubes, belts and sheets.

The following examples illustrate the present invention specifically. All parts in these examples are by weight.

SYNTHESIS EXAMPLE 1

Four moles of polyester polyol having a molecular weight of 2,000 and prepared from 1,4-butanediol and adipic acid was mixed at 80° C. with 1 mole of copolyester polyol having a molecular weight of 2,000 and prepared from 1,6-hexanediol/neopentyl glycol (=7/3 by mole) and adipic acid. The mixed polyol was well mixed with 100 ppm of tin octenoate. The mixture was rapidly mixed and stirred with 5.05 moles of hexamethylene diisocyanate (HDI for short) heated in advance at 40° C. The mixture was taken out onto a vat. The vat was heated at 160° C. for 30 minutes and then at 80° C. for 16 hours to give a thermoplastic polyurethane [A].

The polyurethane obtained was soluble in toluene. A solution of the polyurethane in methyl ethyl ketone to a solids content of 20% by weight had a viscosity of 300 cps.

SYNTHESIS EXAMPLE 2

Two moles of polyester polyol having a molecular weight of 2,000 and prepared from 1,6-hexanediol and adipic acid and 1 mole of copolyester having a molecular weight of 2,000 and prepared from 1,6-hexanediol/neopentyl glycol (=7/3 mole ratio) and adipic acid were mixed at 80° C. The mixture was well mixed with 200 ppm of tetraisopropyl titanate. Then, 2.94 moles of HDI kept at 40° C. was added. The mixture was worked up in the same way as in Synthesis Example 1 to give a thermoplastic polyurethane [B].

The polymer was soluble in toluene. A solution of the polyurethane in methyl ethyl ketone to a solid content of 20% by weight had a viscosity of 200 cps.

SYNTHESIS EXAMPLE 3

One mole of the mixed polyol obtained in Synthesis Example 1 was mixed with 0.3 mole of 1,3,5-hydroxy-3-methylpentane as a chain-extender. Then, 100 ppm, based on the total amount of the resulting mixture, of tin octenoate was added. They were mixed at 80° C., and 1.2 moles of HDI kept at 40° C. was added. The mixture was worked up in the same way as in Synthesis Example 1 to give a thermoplastic polyurethane [C].

The polymer was soluble in toluene. A solution of the polymer in methyl ethyl ketone to a solids content of 20% by weight had a viscosity of 130 cps.

EXAMPLES 1 TO 3 AND COMPARATIVE EXAMPLES 1 TO 3

Using the thermoplastic polyurethanes [A], [B], and [C] obtained in Synthesis Examples 1 to 3, vinyl chloride polymers in accordance with this invention were produced.

An autoclave equipped with a stirrer was charged with 1,000 parts of each of the thermoplastic polyurethanes, 1,000 parts of vinyl chloride monomer and 3 parts of $\alpha, \alpha'$-azodiisobutyronitrile, and at room temperature, they were stirred for 3 hours to dissolve the polyurethane. Then, 5 parts of polyvinyl alcohol and 3,500 parts of water were introduced. The mixture was heated to 60° C., and polymerized for 15 hours. The resulting product in suspension was dried under vacuum at 40° C. to give a powdery polymer.

The vinyl chloride content and the toluene-soluble content of the each of the polymers obtained from the polyurethanes [A], [B], and [C], and the properties of a sheet obtained from each polymer were determined, and the results are tabulated below.

The sheet was prepared as follows: A mixture of 100 parts of the polymer, 3 parts of epoxidized soybean oil, 1 part of calcium stearate and 1 part of zinc stearate was kneaded on a roll at 150° C. for 10 minutes, and then pressed at 170° C. for 5 minutes.

For comparison, each of the thermoplastic polyurethanes [A], [B] and [C] was uniformly blended with polyvinyl chloride (/ =1030) so that the vinyl chloride content was the same as above, and a sheet was prepared in the same way as above. The properties of the sheet are also tabulated below.

The data given in the table demonstrate that the vinyl chloride polymers produced by this invention have better transparency, flexibility and tensile strength than mere blends of polyvinyl chloride with thermoplastic polyurethanes (comparative examples), and are difficultly soluble in organic solvents such as toluene. This fact shows that the polymer is partially grafted.

EXAMPLE 4 AND COMPARATIVE EXAMPLE 4

An autoclave equipped with a stirrer was charged with 500 parts of the thermopolastic polyurethane [A] obtained in Synthesis Example 1, 1,000 parts of vinyl chloride monomer, 3,500 parts of water, 3 parts of α, α'-azodiisobutyronitrile (polymerization initiator) and 5 parts of polyvinyl alcohol (dispersing agent), and the mixture was stirred at room temperature for 3 hours to dissolve the polyurethane, and then polymerized at 60° C. for 15 hours. The resulting product in suspension (1425 parts; 95%) was dried in vacuum at 40° C. to give a powdery polymer.

Analysis showed that the polymer contained 65% of vinyl chloride. The polymer was soluble in toluene only to an extent of 8% in spite of the fact that the starting thermoplastic polyurethane [A] was soluble in toluene.

A moisture of 100 parts of the resulting polymer, 3 parts of epoxidized soybean oil, 1 part of calcium stearate and 1 part of zinc stearate was kneaded on a roll at 150° C. for 10 minutes, and pressed at 170° C. for 5 minutes. The properties of the resulting sheet were determined, and the results are shown in the following table.

For comparison, a sheet was prepared as above except that 100 parts of a blend composed of 35% by weight of thermoplastic polyurethane and 65% by weight of polyvinyl chloride ($\overline{P}$=1030) was used instead of 100 parts of the aforesaid polymer. The results are also tabulated below.

nals, (b) a chain extender having a number average molecular weight of not more than 500, and (c) an aliphatic diisocyanate having an isocyanate group at both terminals.

3. The process of claim 2 wherein the thermoplastic polyurethane is obtained by reacting the components (a), (b) and (c) such that the mole ratio of these satisfy the following expressions:

$$(b)/(a) \leq 2,$$

and $$0.8 < \frac{(c)}{(a) + (b)} \leq 1.1.$$

4. The process of claim 2 wherein the thermoplastic polyurethane is obtained by reacting the components (a), (b) and (c) such that the mole ratio of these satisfy the following expressions:

$$0 \leq (b)/(a) \leq 0.5$$

$$0.95 < \frac{(c)}{(a) + (b)} < 1.02$$

5. The process of claim 2 wherein the long-chain glycol (a) has a number average molecular weight of 500 to 5,000.

6. The process of claim 1 wherein the amount of thermoplastic polyurethane dissolved in the vinyl chloride monomer is from about 30 to 100% by weight, based on the vinyl chloride monomer.

|  | Example 1 | Comp. Example 1 | Example 2 | Comp. Example 2 | Example 3 | Comp. Example 3 | Example 4 | Comp. Example 4 |
|---|---|---|---|---|---|---|---|---|
| Vinyl chloride content (%) | 56 | 56 | 61 | 61 | 53 | 53 | 65 | 65 |
| Polyurethane | [A] | [A] | [B] | [B] | [C] | [C] | [A] | [A] |
| Toluene-soluble content (%) | 17 | 40 | 22 | 33 | 13 | 43 | 8 | 31 |
| Properties of the sheet |  |  |  |  |  |  |  |  |
| Hardness (JISA) (*1) | 72° | 75° | 75° | 80° | 65° | 70° | 85° | 90° |
| Tensile strength (kg/cm²) (*1) | 220 | 190 | 250 | 210 | 180 | 150 | 280 | 230 |
| Elongation (%) (*1) | 550 | 520 | 500 | 500 | 650 | 690 | 450 | 430 |
| Transparency (%) (*2) | 93 | 85 | 90 | 82 | 95 | 88 | 98 | 92 |

(*1): Measured in accordance with JIS K-6301.
(*2): Transparency is expressed by light transmittance at 450 nm.

What is claimed is:

1. A process for producing a vinyl chloride-grafted polyurethane polymer having excellent flexibility, transparency and moldability, which comprises dissolving 30 to 150 parts by weight of a thermoplastic polyurethane prepared from an aliphatic diisocyanate as a polyisocyanate component and being soluble in a vinyl chloride monomer in 100 parts by weight of the vinyl chloride monomer and suspension polymerizing the vinyl chloride monomer in an aqueous medium in the presence of a radical initiator and a suspending agent.

2. The process of claim 1 wherein the thermoplastic polyurethane is derived from (a) at least one long-chain glycol having a number average molecular weight of at least 500 and containing a hydroxyl group at both termi- 7. The process of claim 1 wherein the polymerization is carried out at a temperature of from 30° to 70° C.

8. The process of claim 1 wherein the suspending agent is used in an amount of 0.01 to 5% by weight based on the vinyl chloride monomer.

9. The process of claim 1 wherein the thermoplastic polyurethane is derived from a mixed polyol comprising a polyester polyol having a molecular weight of about 2,000 and prepared from 1,4-butanediol and adipic acid and a copolyester polyol having a molecular weight of about 2,000 and prepared from a mixture of 1,6-hexanediol and neopentyl glycol and adipic acid and hexamethylene diisocyanate.

10. The process of claim 1 wherein the vinyl chloride-grafted polyurethane polymer has a polyurethane content of 20 to 70% by weight.

11. A process for producing a vinyl chloride-grafted polyurethane polymer which comprises dissolving about 100 parts by weight of a thermoplastic polyurethane derived from a long chain glycol and an aliphatic diisocyanate and being soluble in a vinyl chloride monomer in 100 parts by weight of the vinyl chloride monomer and suspension polymerizing the vinyl chloride monomer in an aqueous medium in the presence of a radical initiator and a suspending agent.

* * * * *